Jan. 16, 1962 G. J. COUR 3,017,627

BIT GATE GENERATOR

Filed June 27, 1958 6 Sheets-Sheet 1

INVENTOR
Gene J. Cour
BY Sughrue & Rothwell
ATTORNEYS

Jan. 16, 1962 G. J. COUR 3,017,627

BIT GATE GENERATOR

Filed June 27, 1958 6 Sheets-Sheet 6

INVENTOR
Gene J. Cour

BY Sughrue & Rothwell
ATTORNEYS

United States Patent Office 3,017,627
Patented Jan. 16, 1962

3,017,627
BIT GATE GENERATOR

Gene J. Cour, Vestal, N.Y., assignor to International Business Machines Corporation, New York, N.Y., a corporation of New York Filed June 27, 1958, Ser. No. 745,194
14 Claims. (Cl. 340—350)

This invention relates to a timing pulse generator and more particularly to a generator for generating bit gate pulses for use in information handling systems.

In information handling systems it is often necessary to provide consecutive bit gate pulses to a plurality of separate bit gate terminals. In such systems a word cycle or major cycle is divided into a plurality of minor cycles, each defined and determined by the duration of a bit gate pulse. It has been common in the past to provide these bit gate pulses from a series of cascaded bistable triggers functioning as a binary counter. To provide thirty-two such bit gate pulses, five triggers are used. The outputs of the triggers are fed to a 4 x 8 decoding matrix. For each combination of inputs to the matrix, said matrix produces an output on one bit gate terminal only. Such a system has many disadvantages. Each trigger requires appreciable time to change from one state to another. For certain changes of count, say from fifteen to sixteen, several triggers must change state one after another. The delay is cumulative and the resulting bit gates show various amounts of delay and pulse width. This may result in overlapping of bit gate pulses and even failure to provide a particular pulse during a particular bit.

Another disadvantage occurs due to the fact that some triggers may have different reaction times. Some trigger outputs may go down (relatively negative polarity) before others go up (relatively positive polarity). This causes spikes in the outputs of the triggers.

In some instances, ring counters are used, employing triggers. However, considerable equipment is necessary in such a setup and, in addition, these triggers require A.C. coupling which tends to be less reliable than D.C. coupling.

To overcome all of the above disadvantages, this invention provides the use of a binary counter having a plurality of stages, each stage including a master bistable device which counts every other bit time and a buffer or slave bistable device which counts the bit times in-between. In the case of thirty-two bit gates, four such counter stages are used. Latches are preferably used as the bistable devices. These latches react to changes in D.C. voltage levels. Each latch has at least two inputs and two outputs. One input is called the SET input and upon the introduction thereto of relatively negative voltage a latch in the RESET state will flip to the SET state causing the SET output thereof to go down to a relatively negative voltage and the RESET output to go up. The SET state, for the purpose of this description, may be considered to be the ON or binary 1 condition of the latch, and the RESET state be the OFF or binary 0 condition. After the latch is SET further negative going pulses at the SET input will have no effect on the state of this latch. A relatively negative potential at a RESET input will flip a SET latch to its RESET state and have no effect on a latch already in the RESET state. The RESET latch provides a relatively negative voltage level at its RESET output. It remains then insensitive to further changes in voltage level at the RESET input. The latch may have a number of RESET and SET inputs and even a number of RESET and SET outputs, all functioning as explained above. Additionally, a latch may be so constructed as to be sensitive to positive excursions at the inputs thereof rather than, as explained above, to negative excursions.

By arranging these latches in a manner taught by this invention and providing necessary gating circuitry, including decoding matrixes, a four stage binary counter including four master latches and four buffer latches will provide thirty-two consecutive bit gate pulses at thirty-two independent bit gate terminals.

It is, therefore, an object of this invention to provide a bit gate generator employing bistable devices such as latching circuits which are sensitive to changes in D.C. levels.

It is also an object of this invention to provide a bit gate generator having an absence of spikes in the outputs thereof.

Another object of the invention is to provide such a generator which is reliable in operation and employs a minimum of equipment.

A still further object of this invention is to provide a bit gate generator in which there is no inequality of delay between bit gate pulses nor any variation of pulse width therein.

More specifically, the invention provides a bit gate generator for generating a sequence of bit gate pulses in consecutive minor cycles within a major cycle which generator comprises a plurality of master bistable devices, means to connect said master devices to function as a serial binary counter and means to advance by one the count of said master devices during each ODD minor cycle. Additionally, the generator includes a buffer bistable device associated with each of said master devices and means to cause the buffer devices to assume the count of the master devices during each EVEN minor cycle and decoding means to decode the outputs of the master devices during each EVEN minor cycle and the outputs of the buffer devices during each ODD minor cycle to provide the bit gate pulses.

These and other objects will become apparent from a detailed description of the accompanying drawings.

Figure 4:
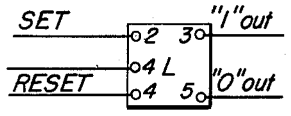

FIG. 4 is a block diagram of a latch as identified in these drawings. The upper left-hand input is a SET or 1 input and the upper right-hand output is a SET or 1 output. The lower left-hand inputs indicated by the circle are the RESET or 0 inputs, and the lower right-hand output is the RESET or 0 output.

Figure 5:
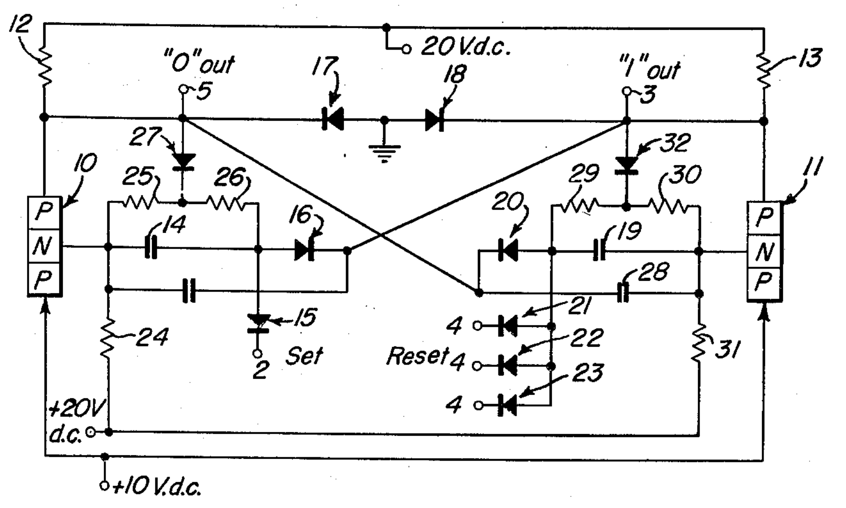

FIG. 5 illustrates the circuitry of the latch shown in block diagram in FIG. 4.

Figures 6, 7, 8, 9, 10, 11, 12, 13, 14, 15, 16, 17:
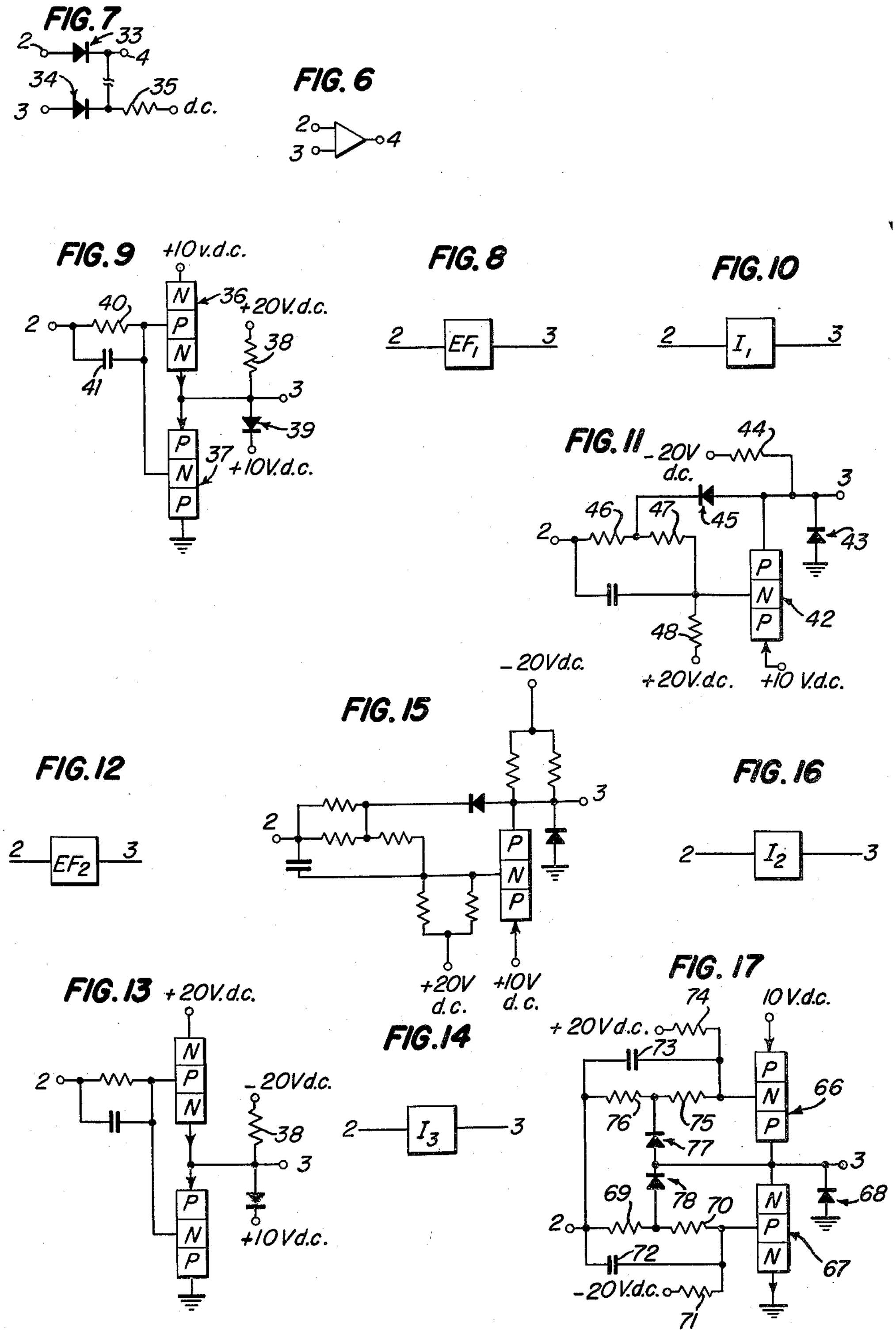

FIG. 6 is a block diagram of a switch functioning as an AND gate; and FIG. 7 is a circuit diagram of the switch of FIG. 6.

FIG. 8 is a block diagram of an emitter-follower identified in these drawings as EF1, and FIG. 9 is a circuit diagram of the emitter-followers shown in FIG. 8.

FIG. 10 is a block diagram of an inverter and identified in these drawings as I1; and FIG. 11 is a circuit diagram of the inverter of FIG. 10.

FIG. 12 is a block diagram of another type of emitter-follower employed in this invention and identified as EF2 in the drawings; and FIG. 13 is a circuit diagram of the emitter-follower of FIG. 12.

FIG. 14 is a block diagram of another type of inverter employed in accordance with this invention and identified as I3 in the drawings; and FIG. 15 is a circuit diagram of the inverter of FIG. 14.

FIG. 16 is a block diagram of still another form of inverter employed in accordance with this invention and identified as I2 in the drawings; and FIG. 17 is a circuit diagram of the inverter of FIG. 16.

Figure 18:
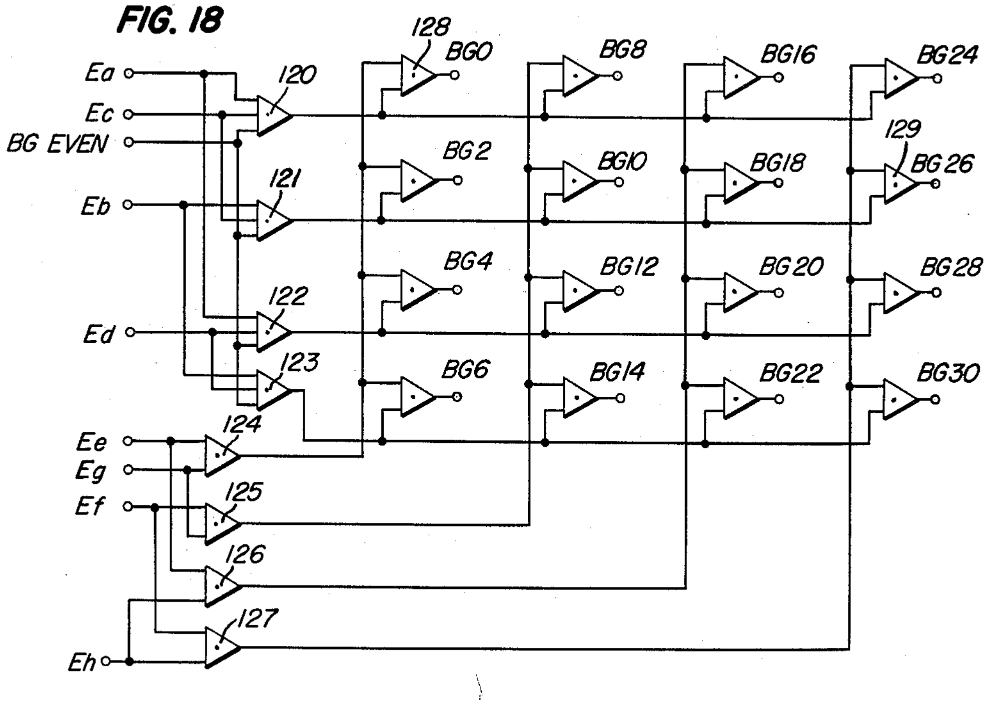
Figure 19:
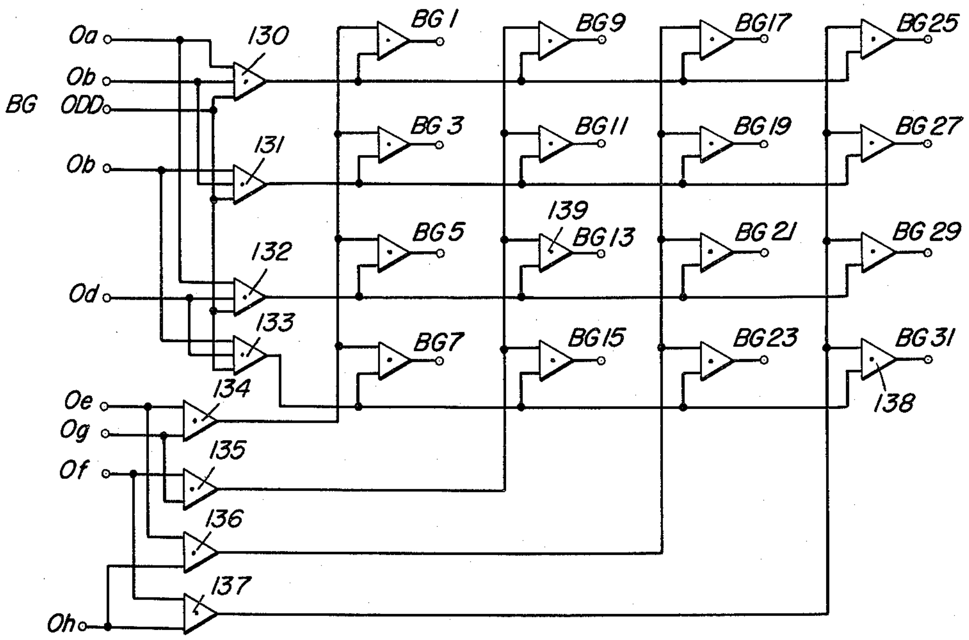

FIG. 18 is a diagrammatic illustration of the EVEN decoding matrix employed in accordance with this invention; and FIG. 19 is a diagrammatic illustration of the ODD decoding matrix used in accordance with this invention.

Figure 1:
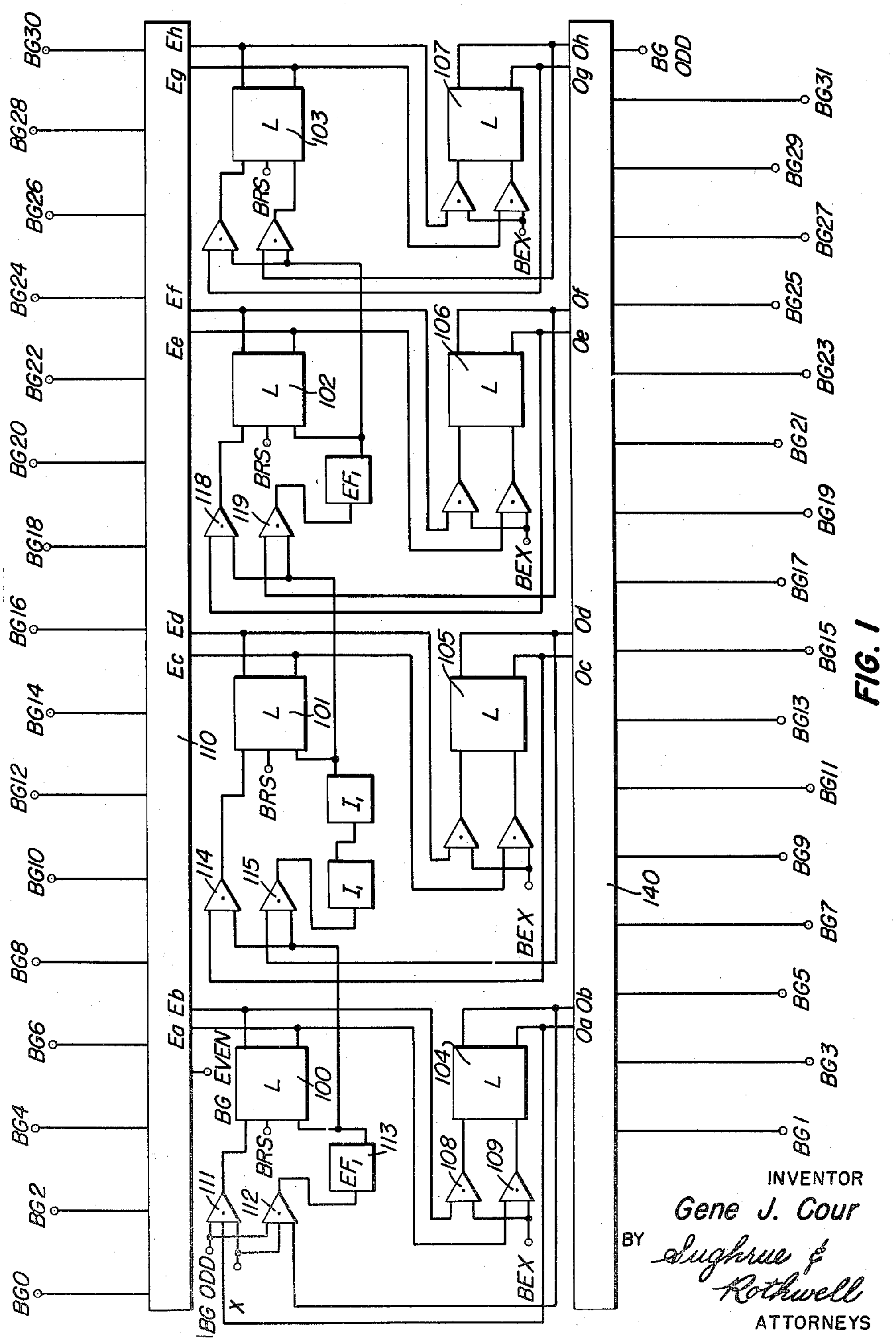
FIG. 1 is a diagrammatic illustration of a bit gate generator constructed in accordance with this invention.

Turning now to the drawings, before describing the bit gate generator of FIG. 1, attention is directed to the circuitry constituting the various elements thereof. It should be noted, however, that no claim is made herein to the specific circuitry but rather all circuitry functioning similarly may be employed. Turning first to FIG. 4, there is shown a block diagram of a latch (L). This latch functions as a bistable device having a SET condition indicative of a binary 1 and a RESET condition indicative of a binary 0. The SET input is connected to pin 2 in the SET or one output is taken from pin 3. The RESET inputs are connected to pin 4 and the RESET or 0 output is taken from pin 5. With the latch in the SET condition responsive to a relatively negative voltage level at pin 2, pin 3 is relatively negative. With the latch in the RESET condition responsive to a relatively negative voltage to any one of pins 4, pin 5 is in the relatively negative voltage level. A SET latch is RESET only by a relatively negative voltage level applied at its RESET input and a RESET latch is SET only by a relatively negative voltage level applied to its SET input.

Turning to FIG. 5, the latch comprises two PNP type transistors 10 and 11. The emitter electrodes of transistor 10 and transistor 11 are connected to their respective lower P regions and are commonly connected to +10 v. D.C. The collector electrodes of transistors 10 and 11 are connected to their respective upper P regions and are commonly connected to —20 v. D.C. through resistors 12 and 13. Additionally, the collectors are connected to the cathodes of diodes 17 and 18. These diodes have their plates connected to ground and prevent the collectors of transistors 10 and 11 from going below ground. The base electrode of transitor 10 is connected through condenser 14 to the plate of diodes 15 and 16 constituting an OR gate. The base electrode of transistor 11 is connected through condenser 19 to the plates of diodes 20, 21, 22 and 23, constituting another OR gate.

Let it now be assumed that transistor 10 is conducting and transistor 11 is non-conducting. Under these conditions, the collector of transistor 10 and consequently pin 5, the RESET output of the latch, is at +10 v. D.C. Diode 17 is non-conducting. The bias on the base of transistor 10 is negative with respect to its emitter as determined by the voltage divider including resistors 24, 25 and 26 connected between +20 v. D.C. and a relatively negative voltage level at 102 Diode 15 is then conducting. The junction of resistors 25 and 26 is connected to the cathode of diode 27 and the plate thereof to pin 5. This prevents said junction from going below the potential of pin 5. Pin 5 is connected to the cathode of diode 20 and through condenser 28 to the base of transistor 11. Diode 20 is non-conducting and has its plate connected to the voltage divider including resistors 29, 30 and 31 to +20 v. D.C. This makes the base electrode of transistor 11 positive with respect to its emitter and, consequently, is non-conducting. Diode 18 is conducting and sets pin 3, the RESET or 1 output, and ground. Diode 32 has its plate connected to the collector of transistor 11 and its cathode to the junction of resistors 29 and 30, thus preventing said junction from going below the level of pin 3. Therefore, a relatively negative voltage level at pin 2 will cause pin 5 to be at a relatively high potential and pin 3 to be at a relatively low potential. The latch is then SET.

The application of a relatively negative potential to any one of the diodes 21, 22 and 23 at pins 4 will drive transistor 11 conducting and make transistor 10 non-conducting to provide a relatively negative level at pin 5 and a relatively positive level at pin 3. The latch is then RESET. A RESET latch will not change condition upon application of a negative level to pins 4 and the SET latch will not change condition upon the application of a relatively negative level to pin 2.

In FIG. 6 a block diagram of a switch functioning as a negative AND gate is shown. Pins 2 and 3 constitute the inputs and pin 4 the output. FIG. 7 shows the circuit diagram for the switch of FIG. 6. In FIG. 7 pin 2 is connected to the plate of diode 33 and pin 3 to the plate of diode 34. The cathodes of these diodes are commonly connected. As shown here, only two inputs are illustrated but a plurality of similar inputs function identically. The cathodes of the diodes are connected through resistor 35 to —D.C. volts. Pin 4, the output, is connected to the common connection for the plates of the diode and upon the simultaneous application of a relatively negative voltage level to all of the inputs, pins 2 and 3 are shown here, pin 4 will be at a relatively negative voltage level since all diodes are then non-conducting. Should less than all diodes be non-conducting, then pin 4 is at a relatively positive potential.

In FIG. 8 there is shown a block diagram of an emitter-follower in which pin 2 constitutes the input and pin 3 the output. In FIG. 9 there is shown a circuit diagram of the emitter-follower of FIG. 8. An NPN type transistor 36 has its collector-electrode connected to the upper N region and said electrode is connected to +10 v. D.C. A PNP type transistor 37 has its collector-electrode connected to the lower P region and said electrode is connected to ground. The emitter-electrode of transistor 36 is connected to the lower N region thereof and to the emitter-electrode of transistor 37. The emitter-electrode of transistor 37 is connected to the upper P region thereof. The emitters of both of these transistors are commonly connected to the output pin 3. Pin 3 is connected through resistor 38 to +20 v. D.C. and also to the plate of diode 39. The cathode of diode 39 is connected to +10 v. D.C. Input pin 2 is connected through resistor 40 and condenser 41 to both bases of transistors 36 and 37. When pin 2 is at a relatively negative potential, transistor 37 is conducting and transistor 36 is non-conducting. Pin 3 is then connected to ground and diode 39 is non-conducting. When pin 2 is at a relatively positive potential transistor 36 is conducting and transistor 37 is non-conducting. Diode 39 conducts, setting pin 3 at +10 v. D.C.

FIG. 10 shows a block diagram of one form of inverter identified at I1. Pin 2 constitutes the input to this inverter and pin 3 the output thereof. FIG. 11 shows the circuit diagram for the inverter of FIG. 10. A transistor 42 of the PNP type has its emitter electrode connected to the lower P region thereof and to +10 v. D.C. Its collector-electrode is connected to the upper P region and to the output pin 3. Pin 3 is also connected to the cathode of diode 43 whose plate is connected to ground. Pin 3 is further connected through resistor 44 to —20 v. D.C. Diode 45 connects pin 3 to the junction of resistors 46 and 47 and prevents this junction from going below the voltage level of pin 3. The input pin 2 is connected through resistors 46, 47 and 48 to +20 v. D.C. The junction of resistors 47 and 48 is connected to the base of transistor 42. A condenser couples pin 2 to the base of transistor 42.

With pin 2 at a relatively positive potential, transistor 42 is non-conducting and diode 43 is conducting. Pin 3 is then at ground. With pin 2 at a relatively negative potential, transistor 42 is conducting, diode 43 is non-conducting and pin 3 is at a relatively positive potential.

FIG. 12 shows a block diagram of another form of the emitter-follower identified herein as EF2. Pin 2 constitutes the input and pin 3 the output. The circuit configuration of EF2 is identical to that of EF1 shown in FIG. 9 except that resistor 38 is connected to −20 v. D.C. instead of +20 v. D.C. in order to provide different loading capabilities.

FIG. 14 shows a block diagram of another type of inverter used in accordance with this invention and identified as I3. Pin 2 constitutes the input thereof and pin 3 the output. The general circuit configuration of this inverter is identical to I1 shown in FIG. 11.

FIG. 16 shows a block diagram of still another inverter used in accordance with this invention and identified as I2. Pin 2 constitutes the input and pin 3 the output thereof. FIG. 17 shows a circuit diagram of the inverter of FIG. 16. Transistor 66 is PNP type and transistor 67 is NPN type. The emitter-electrode of transistor 66 is connected to the upper P region thereof and +10 v. D.C. The emitter-electrode of transistor 67 is connected to the lower N region thereof and to ground. The collector-electrodes are commonly connected to pin 3 and in one case to the lower P region of transistor 66 and in the other case to the upper N region of transistor 67. Pin 2 is also connected to the cathode of diode 68 whose plate is connected to ground. The voltage divider between pin 2 and −20 v. D.C., including resistors 69, 70 and 71, determine the bias on transistor 67. Condenser 71 couples pin 2 to the base of transistor 67. Pin 2 is also connected through condenser 73 to the base of transistor 66. The voltage divider between +20 v. D.C. and pin 2, including resistors 74, 75 and 76, determine the bias on transistor 66. Diode 77 has its plate connected to pin 3 and its cathode connected to the junction of resistors 75 and 76. Diode 78 has its cathode connected to pin 3 and its plate connected to the junction of resistors 69 and 70. Diode 77 prevents the junction of resistors 75 and 76 from going below the level of pin 3. Diode 78 prevents the junction of resistors 69 and 70 from going above the level of pin 3. When pin 2 is at a relatively positive level, transistor 66 is non-conducting and transistor 67 is conducting. Diode 68 is conducting and pin 3 is at a relatively negative potential, in this case ground. When pin 2 is at a relatively negative potential, transistor 66 is conducting and transistor 67 is non-conducting. Diode 68 is non-conducting. Pin 3 is then at a relatively positive potential, in this case about +10 v. D.C.

Figure 2:
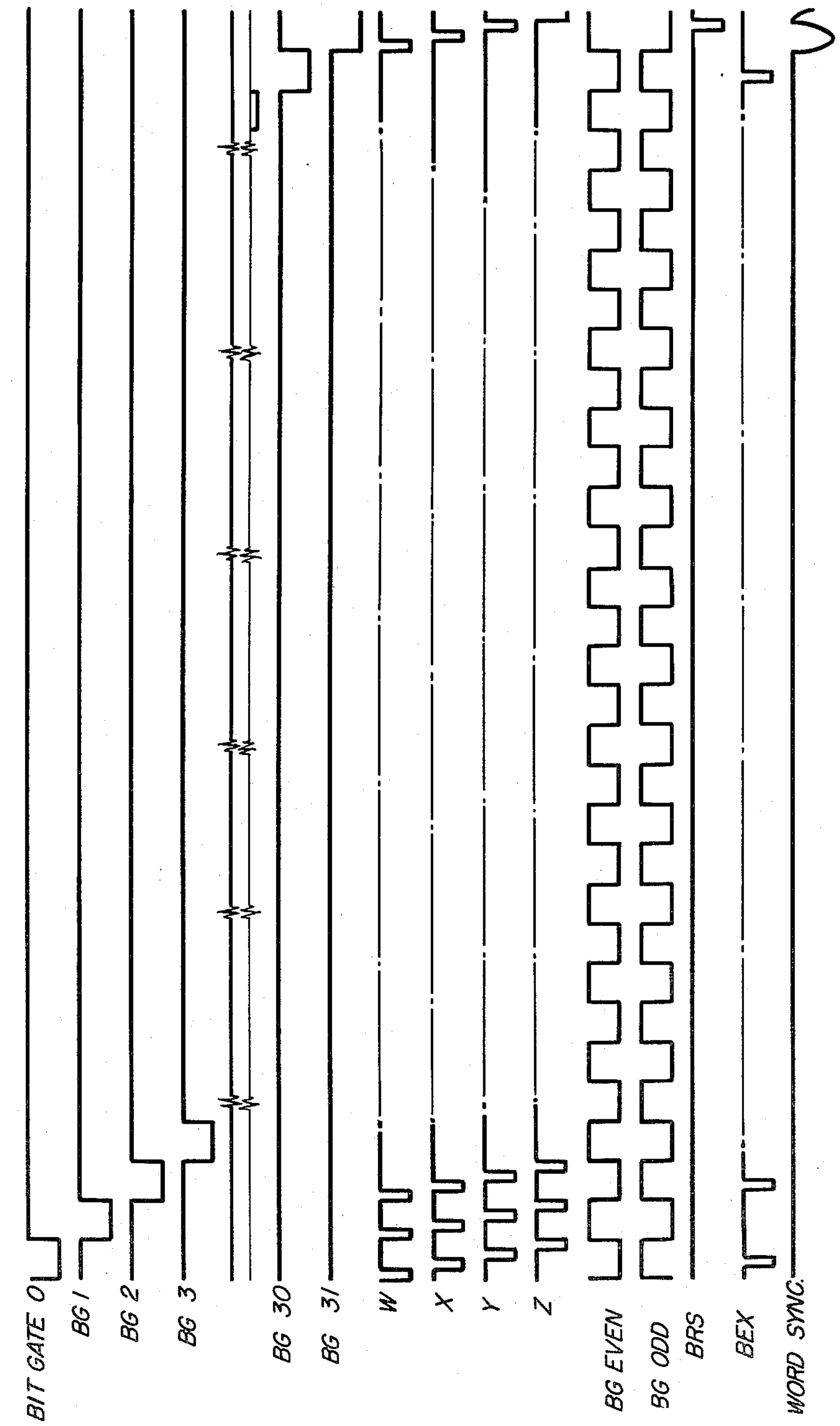
FIG. 2 is a timing chart showing the waveforms of the various input pulses to and the pulses generated by the bit gate generator and associated circuitry of this invention.

Turning to FIG. 2, there is shown the waveforms of the various pulses fed to the generator of FIG. 1 and produced thereby. Consecutive bit gate pulses identified as BG0, BG1 . . . BG31 constitute the desired bit gate output pulses to the selected terminals. BG ODD and BG EVEN pulses are fed to the generator and are 180° out of phase. Within each BG ODD and BG EVEN pulse there are four clock pulses identified as *w*, *x*, *y* and *z* generated in any convenient manner. A BEX pulse is provided to the bit gate generator during *x* time of BG EVEN. A BRS pulse is provided which occurs once each word or major cycle during *y* time of BG 31. A word SYNC pulse is provided once each word or major cycle during BG0.

Figure 3:
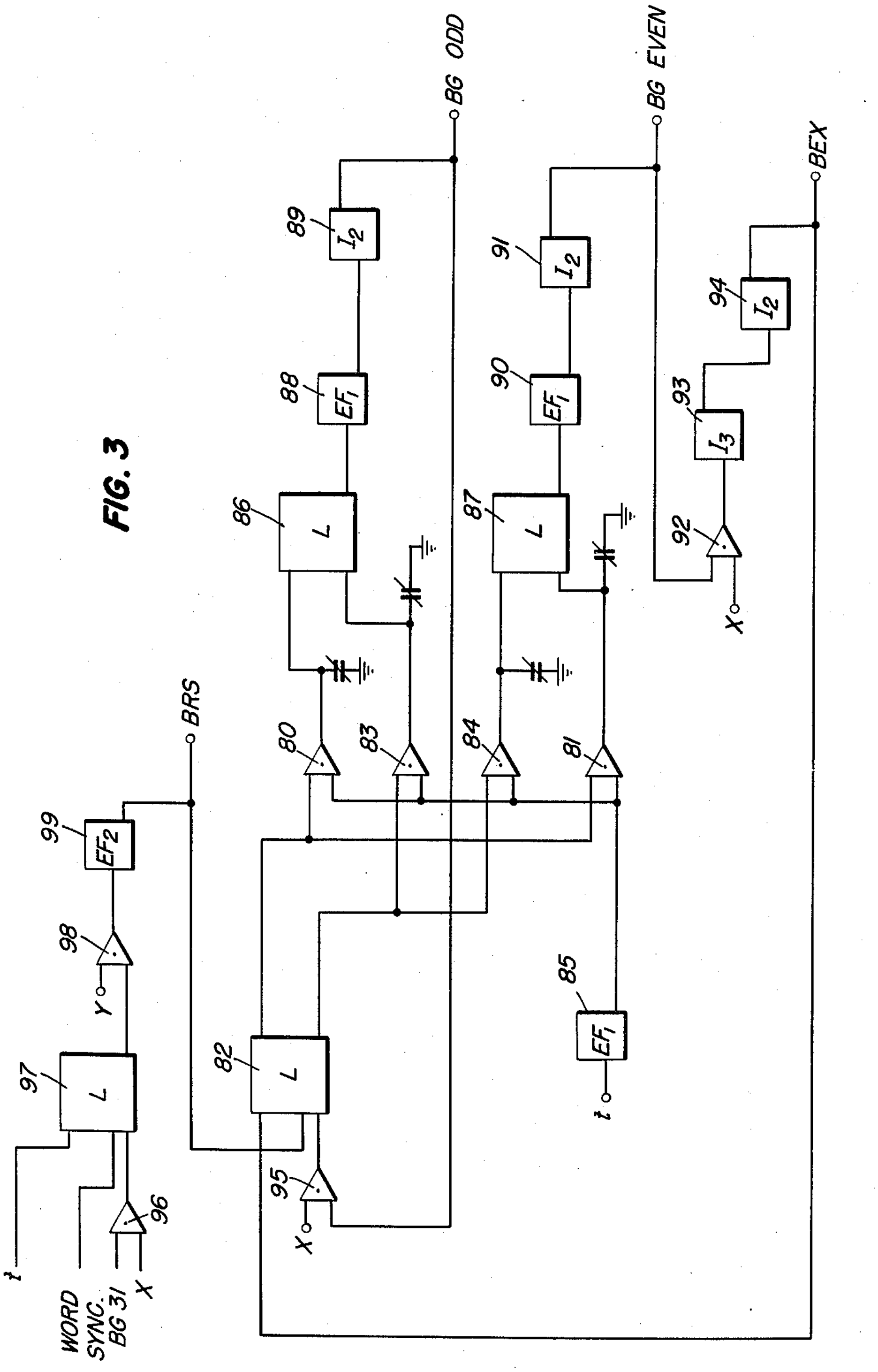
FIG. 3 is a diagrammatic illustration of the means of generating the BG ODD, BG EVEN, BRS and BEX pulses employed in the functioning of the generator of FIG. 1.

Turning to FIG. 3 there is shown the block diagram for the means of generating BG ODD, BG EVEN, BRS and BEX. AND gates 80 and 81 are connected to the SET output of latch 82. AND gates 83 and 84 are connected to the RESET output of latch 82. Let us assume that latch 82 is RESET. Consequently, when *z* clock pulse is fed through emitter-follower 85 to all of these AND gates, only AND gates 83 and 84 will pass said pulse. The pulse from AND 83 is connected to the RESET input of latch 86 to RESET said latch. The pulse from AND 84 is connected the SET input to latch 87 to SET said latch. The down level of the RESET output of latch 86 is fed through emitter-follower 88 and inverted by inverter 89 to provide an up level at BG ODD terminal. The up level at the RESET output of latch 86 is fed through emitter-follower 90 and inverted by inverter 91 to provide a down level at terminal BG EVEN. This also conditions AND gate 92 to to pass the next *x* clock pulse therethrough which is inverted by inverter 93 and further inverted by inverter 94 to provide a negative BEX pulse during *x* time of BG EVEN. This BEX pulse is fed to the SET input of latch 82 to said SET latch. The outputs of this latch then condition ANDS 80 and 81. At the next *z* time, a *z* pulse passes through AND 80 to SET latch 86 and through AND 81 to RESET latch 87. BG ODD then has a down level and BG EVEN has an up level. BG ODD conditions AND gate 95 so that at the next *x* time, an *x* clock pulse thereto will RESET latch 82 and the cycle is repeated.

To insure that latch 82 is RESET at *y* time of BG 31 and consequently that BG ODD is up and BG EVEN is down at this time, a BRS pulse is generated. At *x* time of BG 31, AND gate 96 passes *x* clock pulse to RESET latch 97 to condition AND gate 98 to which its RESET output is fed. At *y* time, *y* clock pulse passes through AND 98 through emitter-follower 99 to the BRS terminal, thus forming the BRS pulse. The BRS pulse is also fed to the RESET input to latch 82 to RESET said latch.

Turning now to FIG. 1, the bit gate generator includes master latches 100, 101, 102 and 103 and buffer or slave latches 104, 105, 106 and 107. Bearing in mind that the BRS pulse is provided at *y* time of BG31, the last bit gate generated during the word cycle, all master latches are RESET thereby since BRS is fed to the RESET inputs to said latches. At time 0, the first minor cycle within the word or major cycle, BEX is fed to AND gates 108 and 109. Since latch 100 is RESET at this time, AND 109 is conditioned to pass BEX to RESET latch 104 The same is true of latches 105, 106 and 107. Now the master and buffer latches are all RESET. BG EVEN, which defines the first minor cycle, is fed to the EVEN matrix 110 to decode said matrix and provide an output on a particular bit gate terminal thereof determined by the combination of inputs thereto from the master latches. Down levels are provided at this time at inputs $E_a$, $E_c$, $E_e$ and $E_g$. As will be seen later, in connection with a description of the EVEN matrix, this results in a bit gate at BG0 terminal.

The next BG ODD pulse is fed to AND gates 111 and 112. Gate 111 is conditioned to pass *x* clock pulse during BG ODD to the SET input of latch 100 to SET said latch. BG ODD to the ODD matrix decodes said matrix to produce BG1. BEX during the next minor cycle finds AND 108 conditioned by latch 100 so that latch 104 is SET thereby. BG EVEN to the EVEN matrix provides BG2.

At *x* time during the next BG ODD pulse, AND gate 112 has been conditioned by latch 104 and passes *x* clock pulse therethrough to emitter-follower 113 to RESET latch 100. The output pulse from emitter-follower 113 is also fed to AND gates 114 and 115. Since latch 105 is RESET, AND gate 114 passes this pulse to the SET input of latch 101 to SET this latch. No output is obtained from AND 115. Now latch 100 is RESET, latch 101 is SET and latches 102 and 103 are RESET. Down levels are fed to the EVEN matrix at inputs $O_b$, $O_c$, $O_e$ and $O_g$ to provide BG3.

It can be seen that the master latches function as a binary counter advancing the count therein for each BG ODD pulse which occurs every other minor cycle. The buffer latches function also as a binary counter since they assume the respective conditions of the master latches during the minor cycles in between. The master latch is advanced on BG ODD, and on BG EVEN the buffer latches assume the count of the master latches. Whenever a pulse is obtained from AND 115, it is fed through inverter 116 and 117 to AND gates 118 and 119. Depending upon the condition of latch 106, latch 102 will either be SET or RESET thereby.

Turning to FIG. 18, there is shown a block diagram for the EVEN decoding matrix of FIG. 1. The input AND gates are identified by 120, 121, 122, 123, 124, 125, 126 and 127. The outputs of the master latches as shown in FIG. 1 are fed to the respective input AND gates. Also, BG EVEN is fed to AND gates 120, 121, 122, and 123. It can be seen that a particular AND gate associated with a particular bit gate will be conditioned to provide a bit gate pulse depending upon the combination of inputs to the matrix from the master latches. For instance, down levels on $E_a$, $E_c$, $E_e$ and $E_g$ will upon application of BG EVEN condition AND gate 128 to provide BG0. Down levels at $E_b$, $E_c$, $E_f$ and $E_h$ will condition AND gate 129 to provide BG26.

Turning to FIG. 19 there is shown a block diagram of the ODD matrix of FIG. 1. The input AND gates 130 to 137 inclusive are fed from the outputs of the buffer latches as shown in FIG. 1. BG ODD pulse is also fed to AND gates 130 to 133. This matrix functions similarly to the EVEN matrix, but, of course, is decoded by a BG ODD instead of a BG EVEN pulse. Down levels at $O_b$, $O_d$, $O_f$ and $O_h$ condition AND 138 to provide BG31. Down levels to $O_a$, $O_d$ and $O_f$ condition AND gate 139 to provide BG13.

What has been shown is one embodiment of the present invention. Other embodiments obvious to those skilled in the art from the teachings herein are contemplated to be within the spirit of the scope of the following claims.

What is claimed is:

1. A bit gate generator for generating a sequence of bit gate pulses in consecutive minor cycles within a major cycle that comprises a plurality of master devices having at least two stable states, means to connect said master devices to function as a counter, means to advance by one the count of said counter during selected minor cycles, a plurality of buffer devices associated with said master devices and having at least two stable states, means to cause said buffer devices to assume a count determined by the particular individual count of each of said master devices during selected minor cycles and means selectively to provide bit gate pulses from said master and buffer devices during each minor cycle.

2. A bit gate generator for generating a sequence of bit gate pulses in consecutive minor cycles within a major cycle that comprises a plurality of master bistable devices, means to connect said master devices to function as a binary counter, means to advance by one the count of said master devices during each odd minor cycle, a buffer bistable device associated with each of said master devices, means to cause said buffer devices to assume the particular individual count of each of said master devices during each even minor cycle and means to decode the outputs of said master devices during each even minor cycle and the outputs of said buffer devices during each odd minor cycle to provide said bit gate pulses.

3. A bit gate generator for generating a sequence of bit gate pulses in consecutive minor cycles within a major cycle that comprises a plurality of master bistable latches, means to connect said master latches to function as a serial binary counter, means to advance by one the count of said master latches during each odd minor cycle, a buffer bistable latch associated with each of said master latches, means to cause said buffer latches to assume the particular individual count of each of said master latches during each even minor cycle and means to decode the outputs of said master latches during each even minor cycle and the outputs of said buffer latches during each odd minor cycle to provide said bit gate pulses.

4. A bit gate pulse generator for generating a sequence of bit gate pulses in consecutive minor cycles within a major cycle that comprises a plurality of master bistable latches, means to connect said master latches to function as a serial binary counter, means to feed a count advancing pulse to at least the first of said master latches in said series during each odd minor cycle to advance by one the count in said master latches, a buffer bistable latch associated with each of said master latches, means to feed pulses to each of said buffer latches during each even minor cycle whereby the count of said buffer latches assumes the particular individual count of each of said master latches and means to decode the outputs of said master latches during each even minor cycle and the outputs of said buffer latches during each odd minor cycle to provide said bit gate pulses.

5. A bit generator for generating a sequence of bit gate pulses in consecutive minor cycles within a major cycle including means to feed said bit gate pulses in said sequence to associated individual odd and even bit gate output terminals therefor that comprises a plurality of master bistable latches and a buffer bistable latch associated with each of said master latches, means to advance the count of said master latches by one during each odd minor cycle, means to cause said buffer latches to assume the count of said master latches during each even minor cycle, means to feed the outputs of said master latches to a first decoding matrix, means to connect said even gate bit terminals to the outputs of said first matrix, means to decode said first matrix during each even minor cycle to provide an even bit gate pulse at a selected even bit gate terminal determined by the outputs of said master latches, means to feed the outputs of said buffer latches to a second decoding matrix, means to connect said odd bit gate terminals to the outputs of said second matrix and means to decode said second matrix during each odd minor cycle to provide an odd gate bit pulse at a selected odd bit gate terminal determined by the outputs of said buffer latches.

6. A bit generator for generating a sequence of bit gate pulses in consecutive minor cycles within a major cycle including means to feed said bit gate pulses in said sequence to associated individual odd and even bit gate output terminals therefor that comprises a plurality of master bistable latches and a buffer bistable latch associated with each of said master latches, each of said latches having a set condition indicative of a binary 1 and a reset condition indicative of a binary 0 and having set and reset inputs and outputs, means to advance the count of said master latches by one during each odd minor cycle, means to cause said buffer latches to assume the count of said master latches during each even minor cycle, means to feed the outputs of said master latches to a first decoding matrix, means to connect said even gate bit terminals to the outputs of said first matrix, means to decode said first matrix during each even minor cycle to provide an even bit gate pulse at a selected even bit gate terminal determined by the outputs of said master latches, means to feed the outputs of said buffer latches to a second decoding matrix, means to connect said odd bit gate terminals to the outputs of said second matrix and means to decode said second matrix during each odd minor cycle to provide an odd gate bit pulse at a selected odd bit gate terminal determined by the outputs of said buffer latches.

7. A bit gate generator as defined by claim 6 wherein said means to decode said first matrix includes means to feed a pulse to an input thereof during each even minor cycle and said means to decode said second matrix includes means to feed a pulse to an input thereof during each odd minor cycle.

8. A bit gate generator as defined by claim 6 further including first means to connect said outputs of each master latch to said inputs to its associated buffer latch and second means to connect the inputs of each master latch to said outputs of its associated buffer latch.

9. A bit gate generator as defined by claim 8 wherein said advancing means includes means to feed a count advancing pulse to at least the first of said master latches during each odd minor cycle and said causing means includes means to feed a pulse to one of the inputs to each of said buffer latches during each even minor cycle to cause said buffer latches to assume the count of said master latches.

10. A bit gate generator as defined by claim 8 wherein said second means includes means to connect said set input to each master latch to said set output of its associated buffer latch, and means to connect said reset input to each master latch to said reset output of its associated buffer latch and said first means includes means to connect said set output of each master latch to said reset input to its associated buffer latch and means to connect said reset output of each master latch to said set input to its associated buffer latch.

11. A bit gate generator as defined by claim 10 wherein said means to connect the reset output of each master latch to said set input to its associated buffer latch includes means to feed said reset output to one input of a first AND gate and means to feed the output of said AND gate to said set input and said means to connect said set output of each master latch to said reset input to its associated buffer latch includes a second AND gate, means to feed said set output to one input to said second AND gate and means to feed the output of said AND gate to said reset input.

12. A generator as defined by claim 10 wherein said means to connect said set input to each of said master latches to said set input to its associated buffer latch includes a third AND gate, means to connect said set output to one input to said third AND gate and means to connect the output of said third AND gate to said set input, and said means to connect said reset input to each of said master latches to said reset output of its associated buffer latch includes a fourth AND gate, means to connect said reset output to one input to said fourth AND gate and means to connect the output of said fourth AND gate to said reset input.

13. A bit gate generator as defined by claim 11 wherein said means to feed a pulse to one of the inputs to each buffer latch during each even minor cycle includes means to feed said pulse to another input to said first and second AND gates.

14. A bit gate generator as defined by claim 12 wherein said means to feed a count advancing pulse to at least the first of said master latches includes said third and fourth AND gates, means to feed said count advancing pulse during each odd minor cycle to another input to said third and fourth AND gates associated with the first of said master latches and means to feed the output of said fourth AND gate associated with each preceding master latch to the other inputs to said third and fourth AND gates associated with the next succeeding master latch.

References Cited in the file of this patent

UNITED STATES PATENTS

| | | |
|---|---|---|
| 2,718,633 | Fennessy | Sept. 20, 1955 |
| 2,768,312 | Goodale et al. | Oct. 23, 1956 |
| 2,832,951 | Browne | Apr. 29, 1958 |
| 2,910,236 | Harper | Oct. 27, 1959 |